United States Patent Office 2,937,966
Patented May 24, 1960

2,937,966

ALKYL CARBAMATE PLASTICIZED MELAMINE-ALDEHYDE RESIN COMPOSITION AND LAMINATE PREPARED THEREFROM

Ivor H. Updegraff, Stamford, and Alexander Coutras, South Norwalk, Conn., assignors to American Cyanamid Company, New York, N.Y., a corporation of Maine No Drawing. Filed Nov. 15, 1957, Ser. No. 696,611

12 Claims. (Cl. 154—43)

This invention relates to novel resinous compositions of matter generally useful in the plastics art, and particularly useful in the decorative laminating art. More specifically, this present invention relates to thermosetting, water-soluble aminoaldehyde condensation reaction products modified with a monocarbamate, such as ethyl carbamate, and to the cured products thereof.

It is an object of this invention to prepare novel resinous compositions of matter comprising thermosetting aminoaldehyde condensation reaction products.

A further object is to provide modified or plasticized thermosetting amino-aldehyde condensation products, having improved physical properties when cured to an infusible and insoluble state.

A specific object of this present invention is to provide thermosetting, water-soluble melamine-formaldehyde condensation products modified with a plasticizer such as ethyl carbamate, which compositions, when cured to an infusible state exhibit, among other desirable properties, excellent flow characteristics.

These and other objects of this invention will be apparent to those skilled in the art especially upon consideration of the detailed disclosure hereinbelow.

Melamine-formaldehyde condensation reaction products find many uses in the plastics field, typified by such applications as molding, coating, and laminating. One of the outstanding advantages of melamine condensation products over other resins such as the polyester resin compositions conventionally employed in analogous practices, is that these condensates are water-white and remain so after cured to an infusible state. Furthermore, cured condensates containing melamine show remarkable stability toward discoloration upon prolonged exposure to sunlight or other types of radiation. Additionally, cured melamine-formaldehyde resins are unexcelled as regards resistance to abrasion, heat and to attack by chemicals and solvents. However, one of the disadvantages associated with cured melamine resins is that these products are inherently brittle and relatively inflexible. This property has hindered the use of melamine resins in such applications where the plastic article prepared therefrom may be hot-punched, post-formed or subjected to other applications where the resinous constituent of the plastic article is required to be somewhat flexible.

Many attempts have been made in the prior art to modify or plasticize melamine resins so as to obviate the inherent brittleness of the cured condensate. It has been exceedingly difficult to find suitable modifiers which will perform satisfactorily as a plasticizer, and at the same time, do not impair the outstanding beneficial qualities of the melamine-formaldehyde condensate. Many of the modifiers of the prior art either produce discoloration, increase water sensitivity excessively, increase opacity, decrease gloss, or lower the chemical and solvent resistance of the cured molded article. Some of the modifiers that have been suggested in the prior art include such materials as toluene sulfonamide, benzene sulfonamide, methyl glucoside, polyvinyl alcohol and the like. These modifiers do render melamine resins less brittle, but not without contributing to one or more of the untoward effects mentioned hereinabove. We have discovered how to plasticize melamine-formaldehyde resins so as to obtain desired degrees of flexibility without impairment of any of the beneficial qualities associated with the cured condensates.

According to our invention, a melamine-formaldehyde condensation reaction product is modified by the addition of from about 2–30%, based on the total solids, of a monocarbamate. Illustrative of the monocarbamates that may be used are esters such as methyl carbamate, ethyl carbamate, propyl carbamate, butyl carbamate and the like including structural isomeric forms thereof. Of these monocarbamates, we prefer the ethyl and butyl carbamates because they impart an optimum degree of flexibility to the melamine-formaldehyde condensate among other considerations. These esters are water-white in color and have excellent color stability. Thus, they do not detract from the outstanding light-stability characteristics of the melamine resin condensate. The monocarbamates of our invention are water-soluble and completely compatible with the water-soluble melamine resin condensates contemplated herein.

The monocarbamates employed in the present invention may be added to the melamine-formaldehyde condensation product at any time prior to the curing of the resinous material. Thus, the monocarbamates may be added to the resinous syrup subsequent to the condensation reaction and homogeneously mixed therewith, or they may exist in the reaction mixture during the condensation reaction. In the preparation of molding or laminating compositions, our modified resinous compositions may be spray dried in accordance with procedures well known in the art. Alternately, if the intended application be a laminating one, the modified aqueous resin syrup may be used directly in such a procedure. Additionally, when it is desired to prepare molding compositions, the modified resinous syrup may be dried in accordance with other procedures such as vacuum concentration, drum drying, and the like. In other words, the method of incorporation of the modifier into the resinous syrup is not critical so long as the modifier is thoroughly and homogeneously mixed with the melamine-formaldehyde condensation product.

An important application of the monocarbamate modified melamine-formaldehyde condensates of our invention is in the field of laminating. Laminates prepared from our modified melamine-formaldehyde condensation products are uniquely suited for certain industrial applications, such as in the manufacture of gears, electrical switch panels, printed electrical circuits and like fabrications. In such applications, the increased flexibility imparted by the monocarbamate modifiers permit these articles to be readily hot-punched, post-formed and amenable to similar related operations requiring a necessary degree of flexibility of the resinous component. Another particularly significant embodiment of our invention is the use of monocarbamate modifiers in laminating syrups which are to be used in fabricating decorative laminates. In such a role, the carbamate modifiers not only impart flexibility to the cured object, but also importantly serve as a flow promoter with the resultant advantage that laminates modified as contemplated herein can be cured at lower ranges of moisture contents thereby permitting the obtainment of optimum dimensional stability characteristics. It is known to those skilled in the art in the preparation of decorative laminating syrups that the moisture content, that is, the moisture content of the laminate subsequent to the drying operation is directly proportional to the flow that is to be obtained upon curing the laminate. However, this method of regulating flow has definite disadvantages. If the moisture content of the laminate prior to curing is too high, dimensional stability of the cured laminate is adversely affected. If the moisture content is low, then the flow property is adversely affected. Poor flow characteristics will generally cause a condition of opaqueness which is obviously highly undesirable when the object is to prepare decorative laminates employing printed overlays. Thus, it can be readily seen that to control flow of the laminates by means of moisture content of the dried laminate can be a delicate operation. A surprising attribute of our modified melamine resin composition is that they are, when cured, acceptably inert to moisture influences. Because of the hydrophilic qualities of our modifiers, one would quite likely expect that cured resinous compositions containing these modifiers would be deleteriously affected by moisture influences. However, no substantial objectionable differences in this regard can be noted between our compositions modified with preferred percentages of the "mono"-carbamate and those that are unmodified or contain hydrophobic type plasticizers. The water-soluble thermosetting melamine-aldehyde condensates employed in the composition of the present invention may be derived by effecting condensation of formaldehyde with the melamine. The ratio of formaldehyde to melamine can be varied over a wide range, depending upon the particular property desired in the final condensation product. Thus, one can use, for instance, from 1 to 6 mols of the aldehyde per mol of melamine. The preferred molar ratios of aldehyde to melamine are from about 1.5:1 to 3:1, respectively. Our invention is particularly adaptable to those thermosetting resinous compositions wherein the amide component comprises melamine. This is so because melamine is one of the more prevalently used inexpensive materials for preparing aldehyde condensates, which condensates are relatively brittle and do not exhibit good inherent flow characteristics when cured. In other words, where an aldehydic reactable material such as benzoguanamine is used solely to prepare a condensate, such a condensate generally shows an acceptable degree of flexibility and suitable flow characteristics and, therefore, modifiers to improve such properties are not as necessary as in the case of melamine-aldehyde condensates. However, it is contemplated in the present invention that our modifiers will beneficially plasticize formaldehyde condensates of mixtures of predominantly melamine and another formaldehyde reactable material such as urea, benzoguanamine, formoguanamine, acetoguanamine, thiourea, dicyanamide, melam, melem, melon, ammeline, ammelide, and the like. While this invention is particularly directed to the modification of unalkylated melamine-aldehyde condensation products, it is to be understood that use may be made of slightly alklated condensates or combinations of a major portion of unalkylated and a minor portion of alkylated melamine condensates.

The initial condensation reaction between the aldehyde, specifically formaldehyde, and melamine may be carried out at normal or at elevated temperature, at atmospheric, sub-atmospheric, or superatmospheric pressures, and under neutral, alkaline, or acid conditions. However, it is preferred that the polymerization and any dehydration be effected under pH conditions in the range of 6.5–9.5 at a temperature of from about 60° to 105° C. When it is desired to carry out the condensation reaction under alkaline conditions, any substance yielding an alkaline aqueous solution may be used, for example, alkali metal or alkali earth metal, oxides, hydroxides, or salts thereof with weak acids. Specifically, one may use sodium, potassium or calcium hydroxide, sodium or potassium carbonate. Further, one may use mono-, di- or triamines, aqueous ammonia, etc., to effect alkaline conditions. Illustrative examples of acid condensation catalysts that may be employed are inorganic and organic acids, e.g., hydrochloric, sulfuric, phosphoric, acetic, lactic, phthalic, maleic, etc., or acid salts such as sodium acid sulfate, mono sodium phosphate, mono sodium phthalate, etc. When it is desired to carry out the condensation reaction under the preferred conditions of pH, namely, in the range of 6.5–9.5, any of the materials mentioned above which effect the desired condition of alkalinity may be employed. Generally, when formaldehyde is reacted with melamine, the reaction medium will possess a pH near the lower limit of the preferred range in the absence of pH control additives.

The condensation reaction between melamine and the aldehyde may be carried out in a single-stage operation, as exemplified in British Patent No. 673,742, wherein all the aldehyde to be employed is initially present with the melamine. In the alternative, the condensation reaction may be carried out in multiple stages, that is, the aldehyde to be employed in the condensation reaction is added in fractional amounts of the total in separate stages during the condensation period. Further details showing the preparation of these melamine-formaldehyde condensation products which may be employed in the practice of our invention are contained in the specific embodiments set forth hereinbelow.

The condensation reaction between melamine and formaldehyde may be carried out in an aqueous or non-aqueous medium, however, the employment of an aqueous medium is preferred. Suitable non-aqueous media are water-soluble alcohols, ketones and such polar materials as dimethyl formamide, dioxane, tetrahydrofurane and the like.

Formaldehyde or compounds engendering formaldehyde such as paraformaldehyde, hexamethylene tetraamine and the like, comprise the preferred aldehydic component in the preparation of the thermosetting melamine resins useful in the compositions of this invention. Nevertheless, for certain applications it may be desirable to use aldehydes such as acetaldehyde, propionaldehyde, butyraldehyde, acrolein, methacrolein, crotonaldehyde, benzaldehyde, furfural, etc., mixtures thereof or mixtures of formaldehyde with one or more of the above-mentioned aldehydes.

When it is desired to produce molding compositions employing the modified melamine-aldehyde compositions of this invention, various fillers and reinforcements may be incorporated into the resinous composition. These additives, which may be introduced into the resinous composition at any suitable stage of its manufacture, include alpha cellulose, wood flour, walnut shell flour, calcined or natural asbestos in the form of powder or short or long fibers, finely divided silicon carbide, carbon black, graphite, diatomaceous earth, ground cuttings, e.g., cuttings of silk, rayon, nylon, or of cloth made from glass fibers, ground cork, etc. The proportions of filler may be varied as desired or as conditions may require. Thus, for example, depending upon the particular filler employed and the intended use of the molded article, the filler may constitute, for example, from 5 to 80% by weight of the molded composition. Obviously, in certain applications, no filler will be present.

In the production of laminates, the sheets are saturated with a solution or syrup of a resinous material. Inasmuch as the modified resinous compositions of this invention are water-soluble, water is frequently the sole solvent of the solutions used for treatment of the laminating sheet. In certain instances it may be desirable to prepare a solution of the modified resinous composition in a water-alcohol solvent. Water-soluble alcohols such as methanol, ethanol, isopropanol, tertiarybutanol, and the like may be employed. The water-alcohol solution of the modified resinous composition is usually employed when the laminating sheets possess a minimum wet strength or when a sheet is employed which has a tendency to wrinkle or shrink when treated with a water solution of the resin. When used, the content of such alcohol seldom exceeds about 30% of the total weight of the solvent. It is preferred, however, that the solvent utilized contain as much as 95 parts water and consequently only 5 parts of a water-soluble alcohol. The amount of the resin utilized in the solution will depend upon the particular type of sheet being treated, temperature of the solution, type of machine employed, etc. Generally, a solution containing about 40% to about 50% by weight of solids is satisfactory; but it may be as low as about 20% to as high as about 60%. The amount of the modified resinous composition employed in the production of the laminates may vary from about 30% to about 80% by weight based on the total weight of said laminate. Obviously, the amount of the resin present in the laminate will vary depending upon the ultimate use of the product and also among other things upon the type of sheet being treated. A resin content between about 40% and 70% by weight is generally satisfactory, the lower quantity being used for decorative print sheets and the higher for overlay sheets. After the sheets are impregnated, they are then dried at elevated temperatures to a suitable volatile content and the sheets are then assembled in multiples between molding press platens and cured at elevated temperatures, e.g., about 120–160° C., and pressures, e.g., about 250–2000 p.s.i., for periods of about 5–45 minutes to form laminated articles. In decorative laminates the overlay and the decorative sheets are both impregnated with the modified resin. In industrial laminates wherein the sheets are all of the same material all of the sheets may be treated with the modified resin. Sheets of fibrous materials, such as alpha cellulose, paper, glass, cloth or cloth formed of silk, cotton, wool, rayons or other synthetic fibers, may be employed in either the lamination production or in the overlay sheet.

Dyes, pigments and other colorants may be incorporated into the resinous compositions of the invention to alter the visual appearance and the optical properties of the finished product. In certain instances, curing agents such as phthalic anhydride, paratoluene sulfonic acid, oxalic acid, strong mineral acids and the like, may also be incorporated into the amino-plastics. Mold lubricants may also be incorporated into the compositions if needed to facilitate molding of the heat-curable convertible compositions to the insoluble and infusible state. Examples of suitable mold lubricants are zinc stearate, calcium stearate, glyceryl monostearate, and the like. Additional plasticizers or flow promoters may likewise be added. In general, the various additives employed with melamine molding and laminating resins as known in the prior art may be used in the novel compositions of this invention. The additives herein discussed may be mixed with either the resinous composition or the modifiers before they are admixed with each other, or the components may be compounded or blended simultaneously. The novel resin compositions may be molded at temperatures between about 135 and about 180° C., and pressures between about 1000 and about 5000 p.s.i., for periods which depend upon the size and especially the cross section of the article and which may range from as high as 30 minutes to as low as 1 minute.

In order that the present invention may be more completely understood, the following examples are set forth in which all parts are by weight unless otherwise indicated. These examples are set forth primarily for the purpose of illustration and any specific enumeration in detail contained therein should not be interpreted as a limitation on the case, except as is indicated in the appended claims.

EXAMPLE I 126 parts of melamine and 162 parts of 37% aqueous formaldehyde (Formalin) are charged to a suitable reaction vessel equipped with an agitator and reflux condenser. The pH of the slurry is adjusted to about from 6.9 to 7.2. The slurry is then heated to reflux temperature in 30 minutes and held at reflux temperature for 20 minutes. The pH is then adjusted to about 10 and the resulting clear solution is spray-dried by conventional methods.

A control laminating syrup is prepared by mixing 100 parts of the spray-dried melamine resin described above, 123.5 parts of water and 6.5 parts of isopropyl alcohol. The mixture is thoroughly mixed by stirring. The resulting resinous syrup is clear and water-white.

A laminating syrup modified in accordance with this invention is prepared by mixing 120 parts of the spray-dried melamine resin described above, 4 parts of ethyl carbamate, 118 parts of water and 6 parts of isopropyl alcohol. Like the unmodified syrup, the modified syrup is clear and water-white.

A substantially pure grade of alpha-cellulose paper (H 900, Hurlbut Paper Company) was impregnated with each of the modified laminating syrup and control laminating syrup. The resin impregnated papers were then dried under a battery of heat lamps. Solid resin pickup was in the order of 66±.5%. In the drying operation, the heat lamps were so adjusted so as to give dried impregnates ranging from about 3 to 6% moisture content. In order to determine flow characteristics of the laminating resin, eight 1¾ inch discs of a given impregnated sheet were assembled and hot cycled at 1100 p.s.i. for 3 minutes at 150° C. In order to determine the water absorption properties of the cured laminate and the hardness thereof amongst other properties, a ⅛ inch laminate was prepared by employing 36 plies of each particular impregnated dried sheet. The plies were cured for 15 minutes at 149° C. under a pressure of 1100 p.s.i. The comparative data obtained for the various laminates are indicated as follows:

Table I

| Sample | Impregnant | Dried Impregnated Sheet—Percent Volatile | Percent Flow | ⅛" Laminate | | |
|---|---|---|---|---|---|---|
| | | | | Percent Water Absorption | | Hot Hardness @ 130° C. (Rockwell R) |
| | | | | 15' Boil | 24 hr. Soak | |
| A | 100% M/F | 5.5 | 0.85 | 0.16 | 0.6 | 121 |
| B | 97% M/F, 3% ethyl carbamate. | 4.9 | 1.2 | 0.12 | 0.4 | 117 |

The hot hardness rating data given above is determined by heating the ⅛" cured laminate to 130° C. and ascertaining the plasticity thereof using the Rockwell "R" scale.

It can be seen from the above data that a melamine-formaldehyde resin modified with only about 3% ethyl carbamate results in a significant increase of flow characteristics. It is to be noted that water absorption characteristics of the modified and unmodified laminates are substantially comparable.

The laminates were also tested for color stability, which property is determined by measuring the reflectance at 700 mu and at 400 mu before and after 50 hours exposure to a sun lamp (Model S1, General Electric Company) and then obtaining numerical color values according to the formula:

$$\frac{R@700\ mu - R@400\ mu}{R@700\ mu} \times 100$$

The control and the herein modified laminate showed a comparable slight degree of yellowing, as determined by the above color-stability test.

EXAMPLE II

A laminating syrup was prepared by dissolving 1500 parts of the spray-dried melamine-formaldehyde condensate of Example I in 1850 parts of water and 100 parts of isopropyl alcohol. This resinous syrup was then divided into 2 parts. To one portion was added a sufficient amount of ethyl carbamate to give a solids content consisting of 88% melamine resin and 12% ethyl carbamate. The modified and unmodified laminating syrups were used to impregnate an alpha-cellulose paper identical with that employed in Example I. The impregnated sheets were dried in the manner employed in Example I so as to result in dried sheets having a variation of moisture contents ranging from about 3.5 to about 6%. The dried sheets containing the various levels of moisture content were tested for flow characteristics and other pertinent characteristics in a manner as set forth in Example I. The comparative data obtained for the modified and unmodified test specimens are set forth in the following table:

Table II

| Sample | Impregnant | Dried Impregnated Sheet, Percent Volatile | Percent Flow | Percent Water Absorp. | | Hot Hardness @ 130° C. (Rockwell R) | Color Stability Color Values | | Opacity |
|---|---|---|---|---|---|---|---|---|---|
| | | | | 15' Boil | 24 hr. Soak | | Original | Exposed | |
| C | 100% M/F resin | 3.6 | 0.15 | 0.12 | 0.3 | 121 | 55-60 | 70-75 | 27-29 |
| A | 100% M/F resin | 5.5 | 0.85 | 0.16 | 0.6 | 121 | | | |
| D | 88% M/F resin, 12% ethyl carbamate | 3.6 | 0.3 | 0.25 | 0.34 | 110 | 58.6 | 70.5 | 24.4 |
| E | 88% M/F resin, 12% ethyl carbamate | 5.2 | 8.0 | 0.26 | 0.62 | 115 | 59.5 | 70.0 | 23.0 |
| F | 88% M/F resin, 12% ethyl carbamate | 6.2 | 21.6 | 0.32 | 1.07 | 115 | 59.2 | 69.2 | 23.3 |

It can be seen from the results listed in Table II that the modification of a melamine resin with ethyl carbamate in the order of approximately 7 to 1, respectively, markedly improves flow characteristics without deleteriously effecting other properties such as color stability, sensitivity to moisture influences and opacity. While the modified laminates exhibited the same hardness as the control laminates in the temperature range of 30-80° C., it is noteworthy that the modified samples were desirably softer at an elevated temperature of 130° C. successfully postformed by heating to a temperature of 170° C. in 60 seconds between infrared lamps and rapidly clamping the hot pieces in wooden dies. The temperature was that registered by a thermocouple embedded in the test laminate. In this way, curved sheets having a right angle bend with a radius of ¼" were readily formed. Similar laminates prepared from the unmodified melamine resin could not be formed in this way without cracking. Paper filled laminates with the modified melamine resin identified as Sample E above displayed excellent punching and machining properties, whereas paper filled laminates prepared with the unmodified melamine resin were considerably inferior in these properties.

EXAMPLE III

An aqueous solution containing 45% of the melamine-formaldehyde condensate of Example I was prepared. An ethyl carbamate modified melamine-formaldehyde resin wherein the proportion of the melamine resin to ethyl carbamate was 78 to 22 respectively, and containing 50% total solids was prepared employing the melamine-formaldehyde condensate of Example I. Alpha-cellulose sheets were impregnated with these syrups and then dried in a manner to yield dried sheets containing moisture levels ranging from 3 to about 6%. The resin content of the dried impregnates was in the order of 63%. Flow characteristics were determined in the manner previously described. These and the data obtained for the ⅛" laminates prepared from said dried sheets are listed in the following Table III:

TABLE III

| Sample | Impregnant | Dried Impregnated Sheet, Percent Volatile | Percent Flow | Percent Water Absorp. | | Hot Hardness @130° C. (Rockwell R) | Color Stability Color Values | | Opacity |
|---|---|---|---|---|---|---|---|---|---|
| | | | | 15' Boil | 24 hr. Soak | | Original | Exposed | |
| G | 78% M/F resin, 22% ethyl carbamate. | 3.0 | 0.15 | 0.87 | 0.43 | | 60.0 | 69.8 | 22.2 |
| H | 78% M/F resin, 22% ethyl carbamate. | 5.0 | 6.4 | 0.59 | 0.59 | 100 | 60.7 | 69.4 | 21.3 |
| I | 78% M/F resin, 22% ethyl carbamate. | 5.7 | 14.4 | 0.62 | 0.75 | 100 | 59.5 | 67.8 | 21.0 |

A light weight canvas duck fabric was impregnated with the syrups identified as Sample A and E above in Table II. Through double impregnation the resin content of the fabric was increased to about 55% after being dried between banks of infrared lamps. Multiple layers of each of the modified and unmodified syrup impregnated fabrics were then laminated to ⅛" thickness by curing at 150° C. for 5 minutes. The laminate containing the modified melamine resin (Sample E) were The results of the various tests set forth in Table II significantly indicate that a comparatively high degree of modification of a melamine resin with ethyl carbamate increases flow properties of the melamine resin considerably. Furthermore, this degree of modification results in excellent plasticity characteristics at elevated temperatures and also enhances color-stability. Nevertheless, in spite of the gain with regard to these beneficial aspects, sensitivity to moisture is not untolerably great.

EXAMPLE IV

A modified laminating syrup was prepared in accordance with the procedure employed in Example III except that propyl carbamate was substituted for ethyl carbamate. A ⅛" laminate was prepared from dried impregnated sheets containing 5% volatiles in the manner described in Example I. Also the standard laminate assembly for determining flow characteristics was prepared from the above-stated dried impregnated sheets. The results obtained with regard to flow characteristics, water absorption, hardness, color stability and opacity for the propyl carbamate modification were substantially identical with those obtained for Sample H of Table III.

We claim:

1. A thermosetting resinous composition of matter comprising from about 70 to 98 parts of resin solids of a heat-curable melamine-formaldehyde aqueous syrup wherein the molar ratio of formaldehyde to melamine ranges from about 1:1 to 6:1, respectively, and as a modifier therefor, correspondingly from 30 to 2 parts of a monocarbamate having the formula $$NH_2COOR$$

wherein R is an alkyl group having not in excess of 4 carbon atoms.

2. A thermosetting resinous composition of matter comprising from about 70 to 98 parts of resin solids of a heat-curable melamine-formaldehyde aqueous syrup wherein the molar ratio of formaldehyde to melamine ranges from about 1:1 to 3:1, respectively, and as a modifier therefor, correspondingly from 30 to 2 parts of a monocarbamate having the formula $$NH_2COOR$$

wherein R is an alkyl group having not in excess of 4 carbon atoms.

3. A thermosetting resinous composition of matter comprising from about 70 to 98 parts of resin solids of a heat-curable melamine-formaldehyde aqueous syrup wherein the molar ratio of formaldehyde to melamine ranges from about 1:1 to 3:1, respectively, and as a modifier therefor, correspondingly from 30 to 2 parts of methyl carbamate.

4. A thermosetting resinous composition of matter comprising from about 70 to 98 parts of resin solids of a heat curable melamine-formaldehyde aqueous syrup wherein the molar ratio of formaldehyde to melamine ranges from about 1:1 to 3:1, respectively, and as a modifier therefor, correspondingly from 30 to 2 parts of ethyl carbamate.

5. A thermosetting resinous composition of matter comprising from about 70 to 98 parts of resin solids of a heat-curable melamine-formaldehyde aqueous syrup wherein the molar ratio of formaldehyde to melamine ranges from about 1:1 to 3:1, respectively, and as a modifier therefor, correspondingly from 30 to 2 parts of propyl carbamate.

6. A thermosetting resinous composition of matter comprising from about 70 to 98 parts of resin solids of a heat-curable melamine-formaldehyde aqueous syrup wherein the molar ratio of formalhyde to melamine ranges from about 1:1 to 3:1, respectively, and as a modifier therefor, correspondingly from 30 to 2 parts of butyl carbamate.

7. An infusible, insoluble, thermoset product of a resinous composition of matter comprising from 70 to 98 parts of resin solids of a heat-curable melamine-formaldehyde aqueous syrup wherein the molar ratio of formaldehyde to melamine ranges from about 1:1 to 3:1, respectively, and as a modifier therefor, correspondingly from 30 to 2 parts of methyl carbamate.

8. An infusible, insoluble, thermoset product of a resinous composition of matter comprising from 70 to 98 parts of resin solids of a heat-curable melamine-formaldehyde aqueous syrup wherein the molar ratio of formaldehyde to melamine ranges from about 1:1 to 3:1, respectively, and as a modifier therefor, correspondingly from 30 to 2 parts of ethyl carbamate.

9. An infusible, insoluble, thermoset product of a resinous composition of matter comprising from 70 to 98 parts of resin solids of a heat-curable melamine-formaldehyde aqueous syrup wherein the molar ratio of formaldehyde to melamine ranges from about 1:1 to 3:1, respectively, and as a modifier therefor, correspondingly from 30 to 2 parts of butyl carbamate.

10. An infusible, insoluble, thermoset product of a resinous composition of matter comprising from 70 to 98 parts of resin solids of a heat-curable melamine-formaldehyde aqueous syrup wherein the molar ratio of formaldehyde to melamine ranges from about 1:1 to 3:1, respectively, and as a modifier therefor, correspondingly from 30 to 2 parts of propyl carbamate.

11. A heat- and pressure consolidated laminate comprising superimposed sheets of fibrous material impregnated and bonded together with a thermoset product of a resinous composition of matter comprising from 70 to 98 parts of resin solids of a heat-curable melamine-formaldehyde aqueous syrup wherein the molar ratio of formaldehyde to melamine ranges from about 1:1 to 3:1, respectively, and as a modifier therefor, corespondingly from 30 to 2 parts of ethyl carbamate.

12. A heat- and pressure consolidated laminate comprising superimposed sheets of fibrous material impregnated and bonded together with a thermoset product of a resinous composition of matter comprising from 70 to 90 parts of resin solids of a heat-curable melamine-formaldehyde aqueous syrup wherein the molar ratio of formaldehyde to melamine ranges from about 1:1 to 3:1, respectively, and as a modifier therefor, correspondingly from 30 to 2 parts of butyl carbamate.

References Cited in the file of this patent

UNITED STATES PATENTS

| | | |
|---|---|---|
| 2,226,202 | Hill et al. | Dec. 24, 1940 |
| 2,740,736 | Elmer et al. | Apr. 3, 1956 |
| 2,837,561 | Beinfest et al. | June 3, 1958 |